(12) United States Patent
Addarich (10) Patent No.: US 12,457,936 B2
(45) Date of Patent: Nov. 4, 2025

(54) COMBINATION MOWER AND EDGING DEVICE

(71) Applicant: Tania Addarich, Winter Park, FL (US)

(72) Inventor: Tania Addarich, Winter Park, FL (US)

( * ) Notice: Subject to any disclaimer, the term of this patent is extended or adjusted under 35 U.S.C. 154(b) by 613 days.

(21) Appl. No.: 17/939,076

(22) Filed: Sep. 7, 2022

(65) Prior Publication Data

US 2023/0086025 A1    Mar. 23, 2023

Related U.S. Application Data

(60) Provisional application No. 63/246,852, filed on Sep. 22, 2021.

(51) Int. Cl.
*A01D 43/16*  (2006.01)
*A01D 69/02*  (2006.01)
*A01D 101/00* (2006.01)

(52) U.S. Cl.
CPC .............. *A01D 43/16* (2013.01); *A01D 69/02* (2013.01); *A01D 2101/00* (2013.01)

(58) Field of Classification Search
CPC ................................. A01D 43/16; A01D 69/02
See application file for complete search history.

(56) References Cited

U.S. PATENT DOCUMENTS

| | | | | |
|---|---|---|---|---|
| 2,521,033 A * | 9/1950 | Bell | ........................ | A01G 3/062 56/17.4 |
| 2,622,384 A * | 12/1952 | Velotta | ................... | A01G 3/062 56/2 |
| 2,643,503 A * | 6/1953 | Noyes | ..................... | A01G 3/062 56/13.7 |
| 2,707,858 A * | 5/1955 | Katzen | ................... | A01D 43/16 172/14 |
| 2,862,344 A * | 12/1958 | Caudle, Jr. | ............. | A01D 43/16 56/16.9 |
| 2,938,323 A * | 5/1960 | Shaver | ................... | A01D 43/16 56/16.9 |
| 3,191,368 A * | 6/1965 | Hidalgo | ................. | A01D 43/16 D15/17 |
| 3,304,700 A * | 2/1967 | Barber | ................... | A01D 43/16 56/13.7 |
| 3,407,579 A * | 10/1968 | Decker | ................. | A01D 34/84 172/15 |
| 3,421,300 A * | 1/1969 | Rhodes | ................. | A01D 34/63 56/10.8 |

(Continued)

*Primary Examiner* — Claude J Brown
(74) *Attorney, Agent, or Firm* — Jason T. Daniel, Esq.; Daniel Law Offices, P.A.

(57) ABSTRACT

A combination mower and edging device includes a chassis having a pair of front wheels, a pair of rear wheels and a pair of handlebars. An electric driving motor is connected to the rear wheels, and an electric mower motor is connected to a cutting blade that is positioned within an annular cutting chamber located beneath the chassis. An electric edging motor is coupled to a vertically oriented edging blade that is positioned along a distal end of an elongated support rod. The rod moves the edging blade between a raised and lowered configuration via a control lever on the handlebars. The mower motor, drive motor and edging motor are connected to an onboard controller and operated by user interface devices located along the handlebars. A housing encloses each of the motors and a collection bag is connected to an opening within the annular chamber to collect grass clippings.

15 Claims, 6 Drawing Sheets

(56) References Cited

U.S. PATENT DOCUMENTS

| | | | | | |
|---|---|---|---|---|---|
| 3,531,922 | A | * | 10/1970 | Hansen | A01D 43/16 56/13.7 |
| 3,604,208 | A | * | 9/1971 | Borunda | A01D 43/16 56/11.5 |
| 3,676,989 | A | * | 7/1972 | Slayton | A01G 3/062 56/11.9 |
| 3,686,839 | A | * | 8/1972 | Lambert | A01D 43/16 56/16.9 |
| 3,690,384 | A | * | 9/1972 | Patterson | A01D 43/16 172/14 |
| 3,693,334 | A | * | 9/1972 | Lowery | A01D 43/16 56/16.9 |
| 4,478,028 | A | * | 10/1984 | Dawson, Jr. | A01G 3/062 56/16.9 |
| 4,551,967 | A | * | 11/1985 | Murcko | A01D 43/16 56/13.7 |
| 5,179,823 | A | * | 1/1993 | Pace | A01D 43/16 56/16.9 |
| 5,497,606 | A | * | 3/1996 | Baxter | A01D 43/16 56/16.9 |
| 7,165,383 | B1 | * | 1/2007 | Luton, Jr. | A01D 34/84 56/13.7 |
| 8,464,504 | B1 | * | 6/2013 | Huff | A01D 43/16 56/13.7 |
| 2008/0086997 | A1 | * | 4/2008 | Lucas | A01D 69/025 318/441 |

* cited by examiner

COMBINATION MOWER AND EDGING DEVICE

CROSS-REFERENCE TO RELATED APPLICATIONS

This application claims the benefit of U.S. Application Ser. No. 63/246,852 filed on Sep. 22, 2021, the contents of which are incorporated herein by reference.

TECHNICAL FIELD

The present invention relates generally to lawn and garden equipment, and more particularly to a combination mowing and edging device.

BACKGROUND

The statements in this section merely provide background information related to the present disclosure and may not constitute prior art.

For millions of homeowners, renters, and other individuals, weekly or monthly lawn care is a chore that must be performed. To obtain the best results, this typically requires the individual to utilize a lawn mower to cut their grass, and to then utilize a mechanical edger to prevent the grass from growing onto secondary items such as gardens, driveways, and sidewalks, for example.

The prior art has many known types of manual, self-propelled and riding lawn mowers. Likewise, there are many known types of mechanical edging devices having a motor and vertical blade. Although these devices are useful in their own rights, the requirement to purchase, store, maintain, and ultimately utilize two separate machines for this related work requires a relatively high investment on the part of the user.

The present invention, directed to a combination mower and edging device differs from the conventional art in a number of aspects. The manner by which will become more apparent in the description which follows, particularly when read in conjunction with the accompanying drawings.

SUMMARY OF THE INVENTION

The present invention is directed to a combination mower and edging device. One embodiment of the present invention can include a chassis having a pair of front wheels, a pair of rear wheels and a pair of handlebars. In one embodiment, an electric driving motor can be connected to the wheels in order to self-propel the mower in accordance with a user command.

In one embodiment, the device can include an electric mower motor having an output shaft that is connected to a horizontally oriented blade positioned within an annular cutting chamber located beneath the chassis. The mower motor can be connected to an onboard controller and operated by a user interface located along the handlebars.

In one embodiment, the device can include an electric edging motor that is mechanically coupled to a vertically oriented edging blade. The edging blade can be connected onto an elongated support rod and can transition between a raised and lowered configuration. A control lever can be positioned along the handlebars and can mechanically raise and lower the support rod in order to selectively operate the edging motor.

A housing can be provided along the chassis to protect the device components, and an optional bagger can be connected to an opening within the annular chamber to collect the cut grass clippings during device operation.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described herein, the term "rotatably secured" and derivatives thereof shall be used to describe a situation wherein two or more identified objects are joined together in a manner that allows one or both of the objects to pivot, rotate, and/or move about or in relation to the other object in one or more of a horizontal, diagonal or vertical manner. Several nonlimiting examples of connectors for pivotally connecting objects together include traditional single or double hinge mechanisms, ball joint couplers, rotational couplers, pulley couplers, single axis pins, and/or swivel flanges, for example.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-6 illustrate one embodiment of a combination mower and edging device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 1:
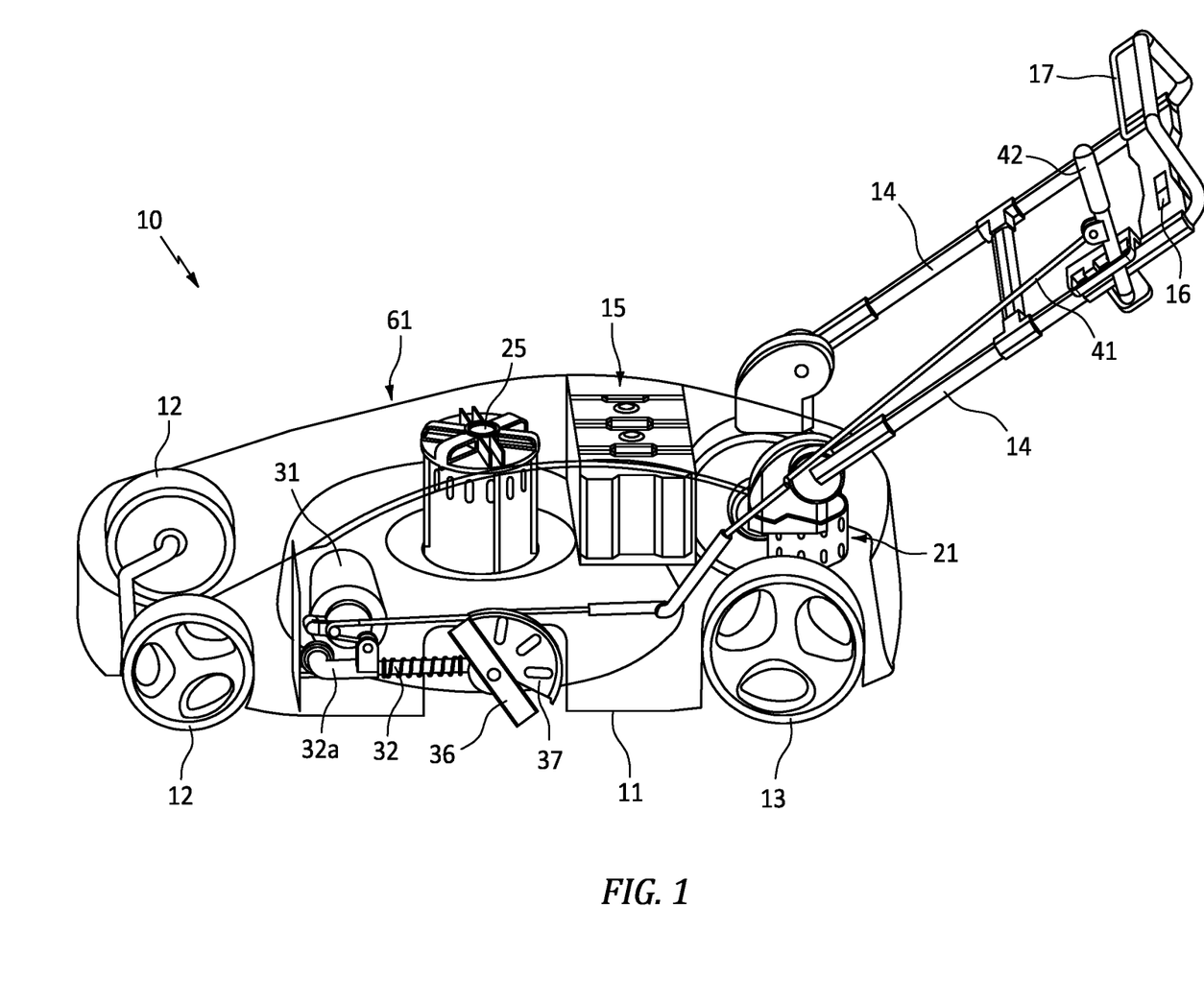
FIG. 1 is a side view of a combination mower and edging device that is useful for understanding the inventive concepts disclosed herein.
Figure 2:
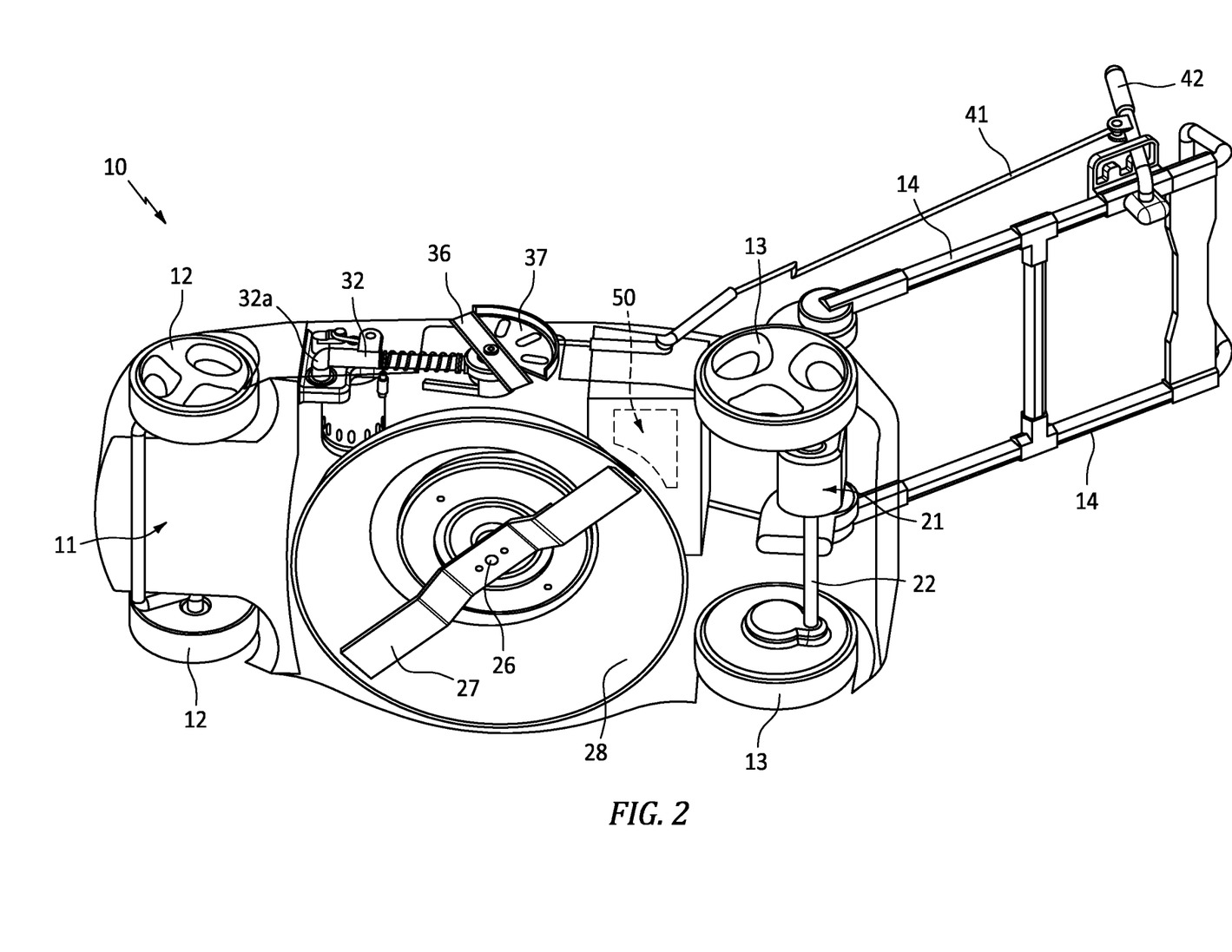
FIG. 2 is a perspective view of the combination mower and edging device in accordance with one embodiment of the invention.
Figure 3:
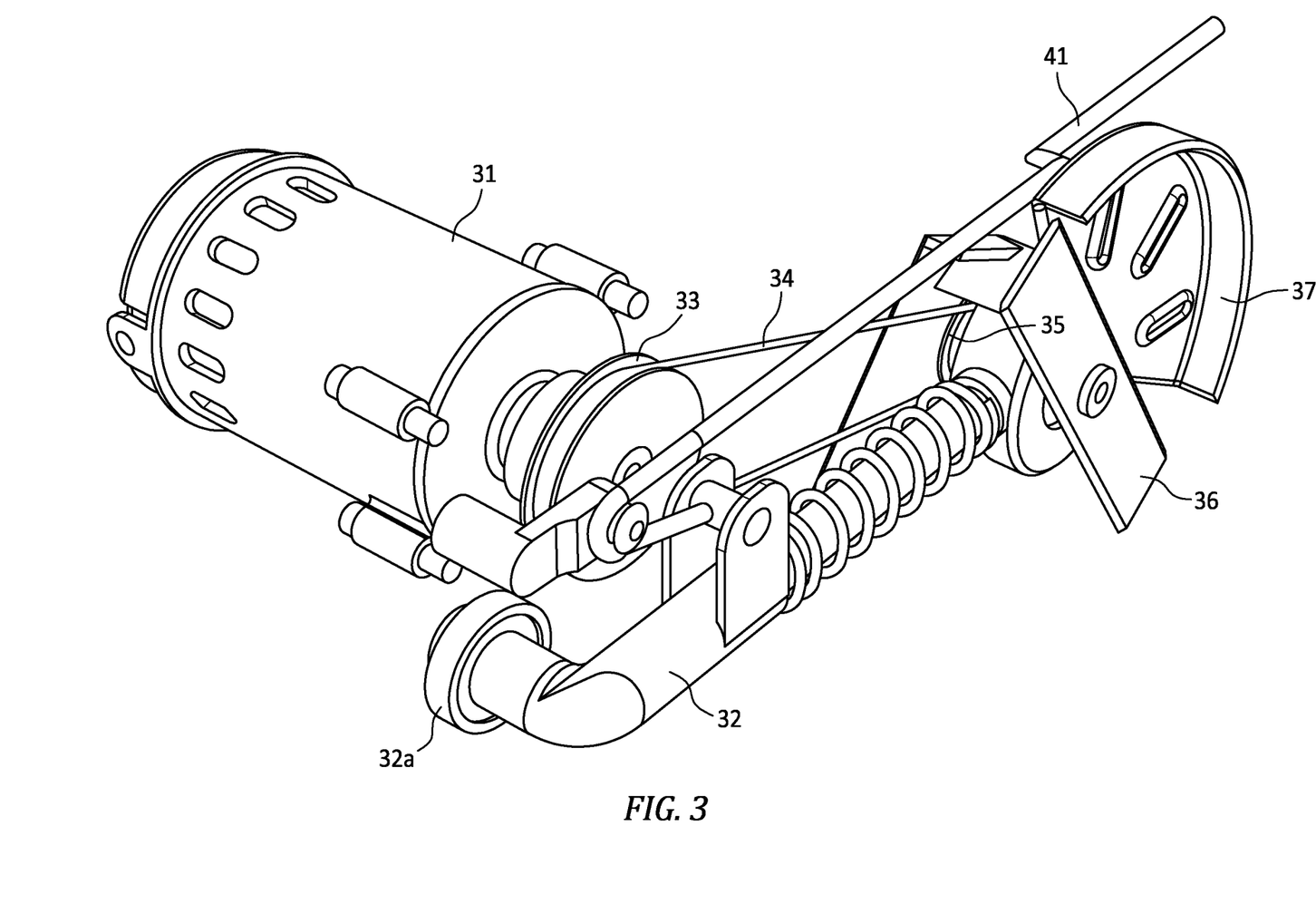
FIG. 3 is an enlarged partial perspective view of the edging system components of the combination mower and edging device, in accordance with one embodiment of the invention.
Figure 4A:
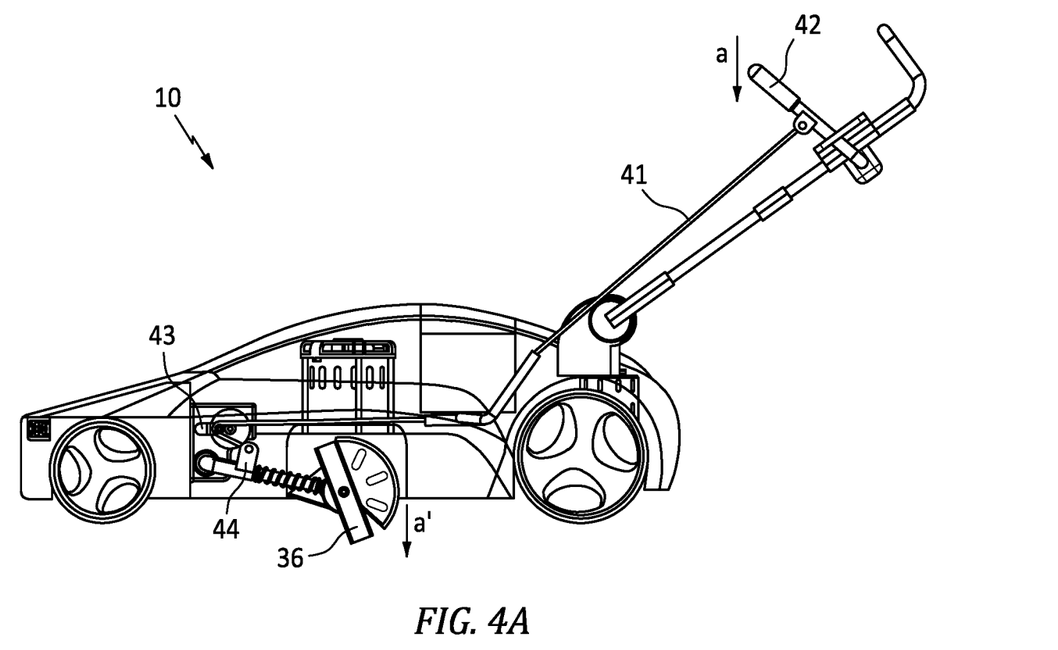
FIG. 4A is a side view of the combination mower and edging device with the edging system in the lowered and operational position, in accordance with one embodiment of the invention.
Figure 4B:
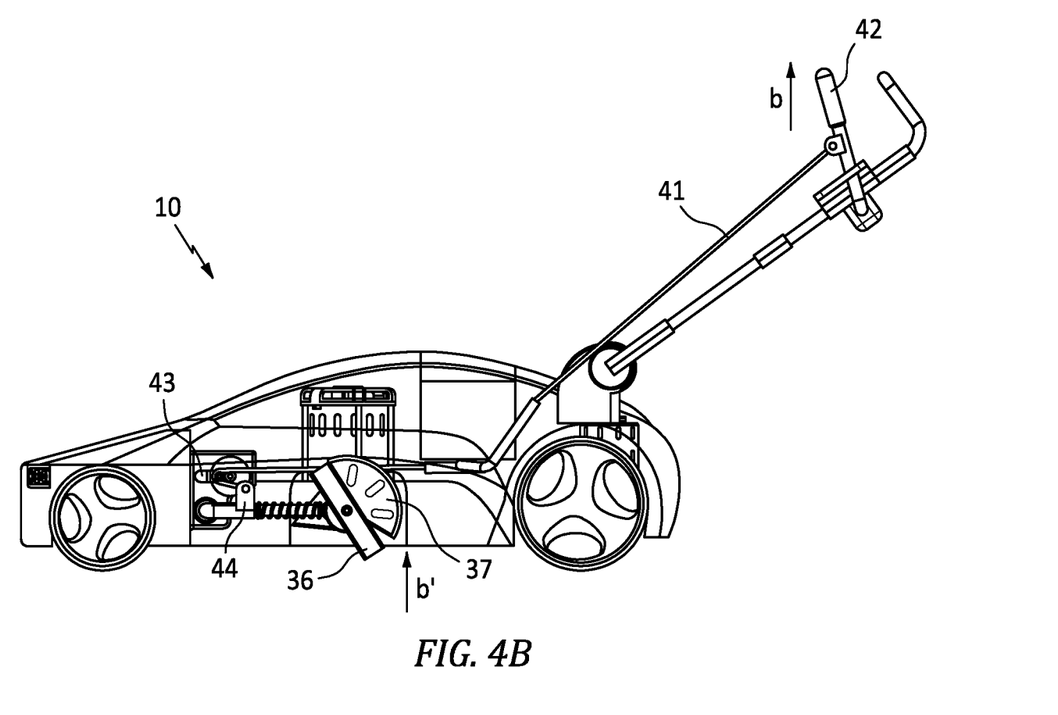
FIG. 4B is a side view of the combination mower and edging device with the edging system in the raised and non-operational position, in accordance with one embodiment of the invention.

As shown best at FIGS. 1 and 2, the device 10 can include a chassis 11 having a pair of front wheels 12 along the front end of the device, a pair of rear wheels 13 along the back end of the device, and a pair of handlebars 14 that extend away from the back end of the device. In one embodiment, one or more batteries 15 can be positioned along the chassis and can be connected to a controller 50 and any number of user controls such as a mower motor on/off button 16, and/or a drive motor operation lever 17, among others, for example.

In one embodiment, the device 10 can include an electric drive motor 21 which can preferably be positioned along the chassis 11 at the back end of the device. The electric drive motor can produce a rotary output which is operatively connected to one of the rear wheels 13 and/or or the rear axle 22 so as to selectively rotate one or both of the wheels during device operation. In either instance, the drive motor 21 can be connected to the batteries 15 and the drive lever 17 via below described controller 50 so as to be operated by a device user.

In one embodiment, the device 10 can include a mower motor 25 having an output shaft 26 onto which a rotary cutting blade 27 is secured. The motor can be positioned along the top surface of the chassis, and the output shaft can extend downward so as to position the rotary cutting blade 27 horizontally within an annular cutting chamber 28. Although illustrated as a closed cutting chamber for use as a mulching-type mower, other embodiments are contemplated wherein the chamber includes a discharge opening for feeding grass clippings into a collection bag 65 (see FIG. 6).

In the preferred embodiment, the mower motor 25 can comprise an electric motor that is connected to the batteries 15 and the on/off controls 16 via the below described controller 50 so as to selectively rotate the cutting blade 27 with sufficient force to cut grass and weeds of varying heights and thicknesses. Of course, other embodiments are contemplated wherein the mower motor includes, comprises, or consists of a gasoline type motor having an onboard fuel tank.

In one embodiment, an edging motor 31 can be positioned along the top surface of the chassis along one side of the device, and the first end 32a of an elongated support arm 32 can be rotatably connected to the side of the chassis body at a location adjacent to the edging motor. As shown best at cutout FIG. 3, the edging motor 31 can include an output shaft having a pulley 33 that is connected to a drive belt 34 which connects to a second pulley 35. The second pulley 35 is coupled to a vertically oriented rotary edging blade 36 that is positioned within a safety housing 37 located along the second end of the support arm 32.

An operating cable 41 such as a steel cable, for example, can be connected to a lever 42 located along the handlebars at a first end. The body of the cable can be routed along the length of one of the handlebars and can engage a pulley 43 located adjacent to the motor 31, before terminating onto a bracket 44 of the support arm. As shown best at FIGS. 4A and 4B, the cable can be tensioned such that a downward movement (arrow a) of the lever 42 acts to rotate the support arm 32 in a clockwise manner so as to lower the edging blade (arrow a') and activate the edging blade motor 31. Conversely, an upward movement (arrow b) of the lever 42 acts to rotate the support arm 32 counterclockwise so as to raise the edging blade (arrow b') and disengage the edging blade motor.

Although described above with regard to a particular arrangement of components for selectively raising and lowering the edging blade 36, this is for illustrative purposes only. To this end, any number of other components can be provided for selectively transitioning the edging blade between the raised and lowered position. Moreover, the edging motor 31 can include any number of different types and sizes of motors capable of rotating the cutting blade 36 with sufficient force to penetrate natural surfaces (e.g., grass, dirt, gravel, etc.,) and to cut weeds and other vegetation positioned therein.

The controller 50 can function to link and control the operation of the device 10 so as to perform the functionality described herein. As shown best at FIG. 5, one exemplary embodiment of the controller 50 can include a processor 51 that is connected to a memory 52, a component interface unit 53, and a power regulation unit 54.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

Figure 5:
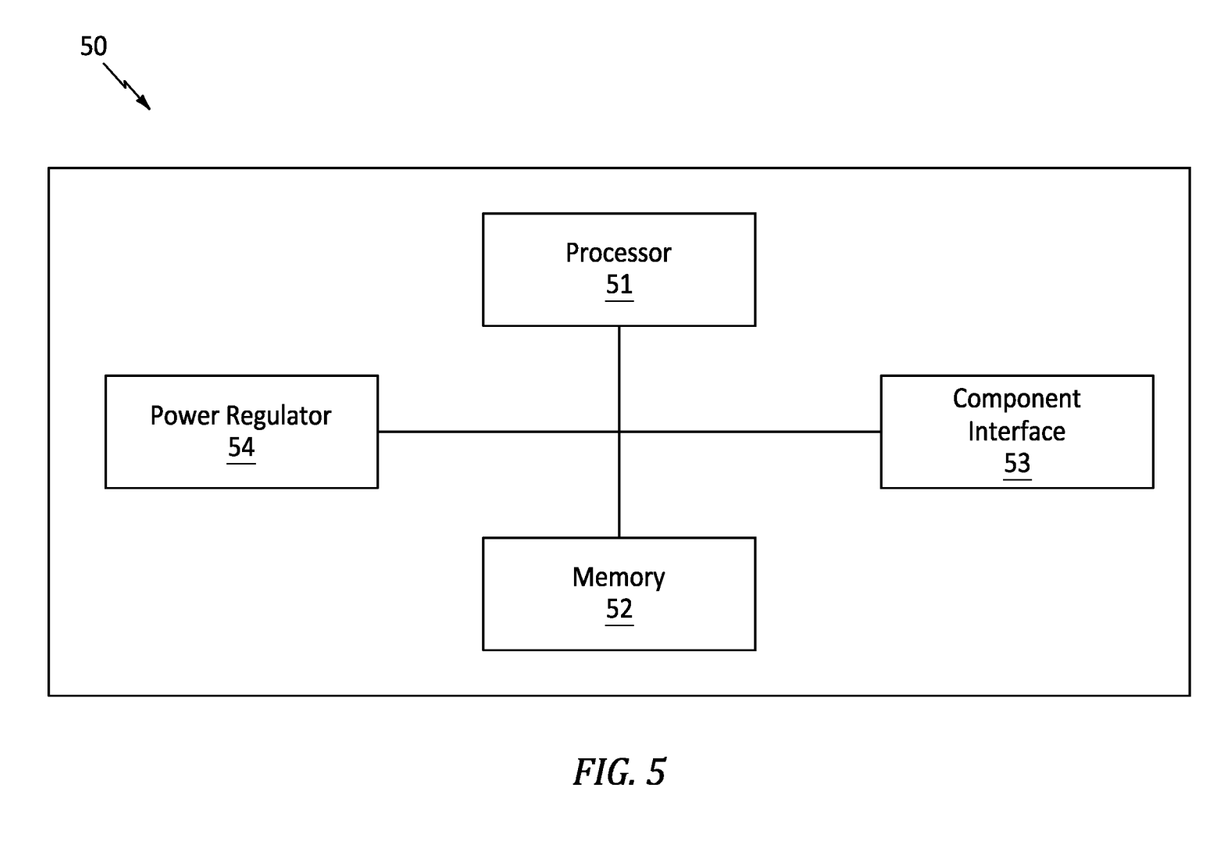
FIG. 5 is a simplified block diagram of the system controller of the device, in accordance with one embodiment of the invention.

The processor 51 can be any type of central processing unit (CPU) or any other type of device, or multiple devices, capable of manipulating or processing information such as program code stored in the memory 52 and for causing the circuitry to complete the activities and functionality described herein.

Memory 52 can act to store operating instructions in the form of program code for the processor 51 to execute. Although illustrated in FIG. 5 as a single component, memory 52 can include one or more physical memory devices such as random-access memory or other non-persistent memory device(s), along with a persistent data storage device.

The component interface unit 53 can function to provide a communicative link between the processor 51 and various other device components such as the drive motor 21, the mower motor 25, the edging motor 31 and the user interface devices and levers such as those described at elements 16 and 17, among many others for example. In this regard, the component interface unit can include any number of different components such as one or more PIC microcontrollers, internal bus, USB connections and other such hardware capable of providing a direct link between the various components. Of course, any other means for providing one- or two-way communication between the identified components can also be utilized herein.

The power regulation unit 54 can function to regulate and/or distribute power being provided to and/or from the batteries 15. In this regard, the power regulation unit can include an onboard battery charger for engaging a power cable to charge the batteries 15, along with any number of surge protectors to prevent the devices electrical components from becoming damaged from an under power or overpower situation.

Figure 6:
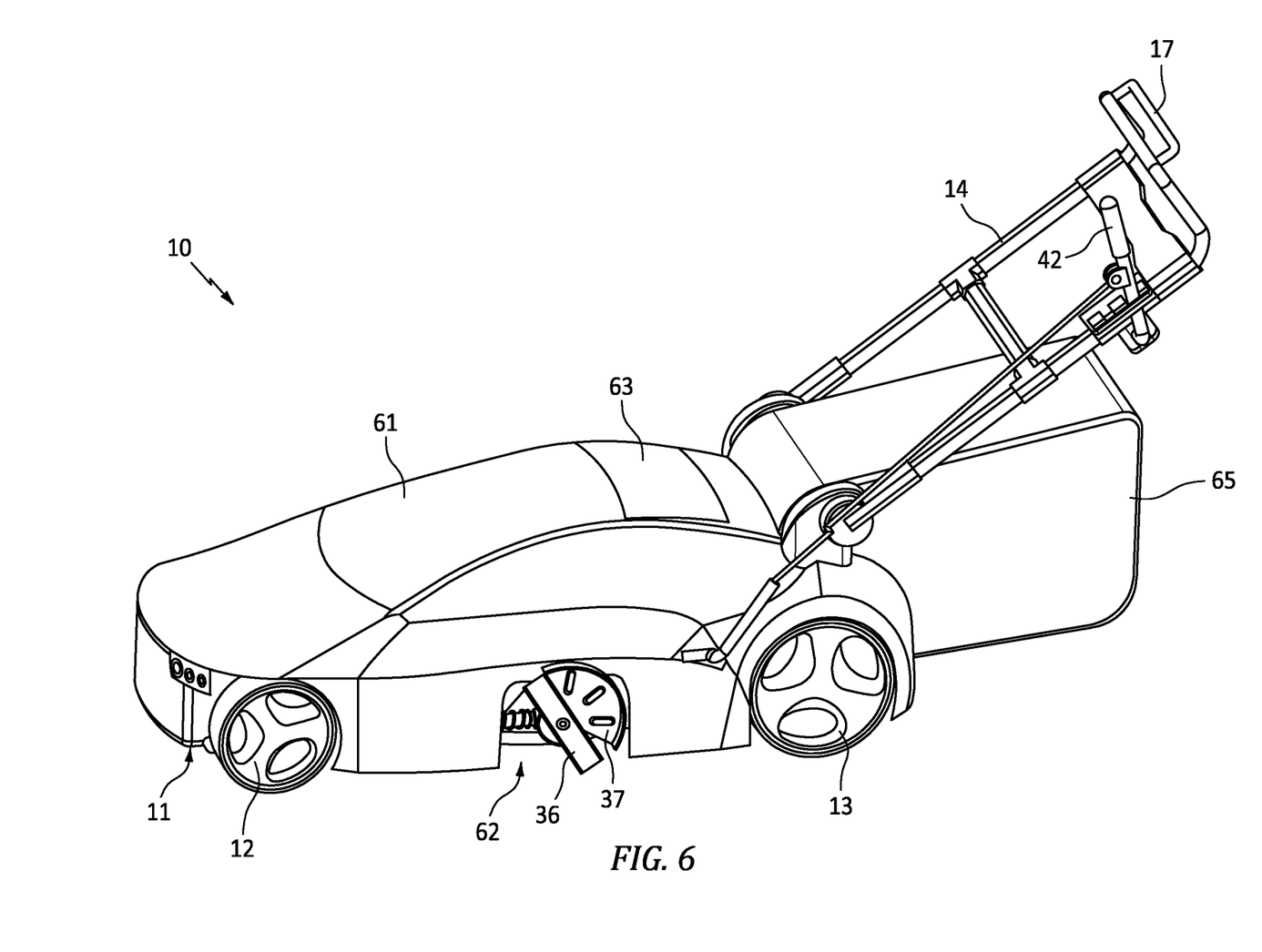
FIG. 6 is a perspective view of the combination mower and edging device in accordance with one embodiment.

As shown best at FIG. 6, the device 10 can include an outer housing 61 beneath which the above noted components can be located. The housing can function to protect the onboard batteries, and the various motors 21, 25 and 31, along with the respective electrical connections from impacts with foreign objects during operation of the mower. As shown, one side of the housing can include an opening 62 for the edging blade 36 and housing 37. An optional battery cover 63 can be provided for allowing access to the onboard batteries, and an optional catch bag 65 can be positioned along the back end of the device in order to collect grass cut by the cutting blade 27.

In operation, a user can selectively operate the drive motor and mower cutting motors in order to mow their lawn. Although not specifically shown, height adjustment mechanisms can be provided along each wheel to allow the user to adjust the length of the grass after it is cut. Whenever appropriate, the user can selectively lower the edging blade to perform an edging operation wherein a vertical path is cut along the ground.

Moreover, it is noted that each of the drive system (e.g., motor 21 and wheels 13), the edging system (e.g., motor 31 and blade 32), and mowing system (e.g., motor 25 and blade 27) may be operated together (e.g., at the same time) or independently from each other in any combination so as to result in 7 distinct operating modes as follows: 1) Walk mode wherein the drive motor is active, the mower motor is inactive and edging motor is inactive; 2) Manual mow mode wherein the drive motor is inactive, the mower motor is active and edging motor is inactive; 3) Self-propelled mow mode wherein the drive motor is active, the mower motor is active and edging motor is inactive; 4) Manual edging mode wherein the drive motor is inactive, the mower motor is inactive and edging motor is active; 5) Self-propelled edging mode wherein the drive motor is active, the mower motor is inactive and edging motor is active; 6) Manual mow and edging mode wherein the drive motor is inactive, the mower motor is active and edging motor is active; and 7) Self-propelled mow and edging mode wherein the drive motor is active, the mower motor is active and edging motor is active.

Accordingly, the above-described mowing and edging device provides a novel solution for allowing users to mow and edge any type of landscape without the hassle of obtaining, maintaining and using multiple pieces of different equipment.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A mower and edging device, comprising:
a chassis having a front end, a back end, a top surface and a bottom surface;
a pair of handlebars that extend outward from the back end of the chassis;
a pair of front wheels located along the front end of the chassis;
a pair of rear wheels located along the back end of the chassis;
an electric drive motor that is positioned along the chassis, said drive motor being mechanically connected to at least one of the pair of front wheels or the pair of rear wheels;

an electric mower motor that is positioned along the top surface of the chassis;
a rotary cutting blade that is connected to the mower motor, said cutting blade being positioned beneath the chassis;
an electric edging motor that is positioned along the chassis;
a rotary edging blade that is mechanically coupled to the edger motor;
at least one battery that is in communication with each of the mower motor, the edging motor and the drive motor; and
a controller that is in communication with each of the at least one battery, the mower motor the edging motor and the drive motor,
wherein the controller is configured to selectively operate in seven distinct operating modes.

2. The device of claim 1, further comprising:
an elongated support arm having a first end that is rotatably connected to a side of the chassis.

3. The device of claim 2, wherein the rotary edging blade is connected to a second end of the elongated support arm.

4. The device of claim 3, wherein the elongated support arm is configured to selectively raise and lower the rotary edging blade.

5. The device of claim 3, further comprising:
an operating cable having a first end and a second end; and
a control lever that is positioned along one of the handlebars.

6. The device of claim 5, wherein a first end of the operating cable is connected to the control lever and a second end of the cable is connected to the first end of the elongated support arm.

7. The device of claim 6, wherein a movement of the control lever in a first direction results in the control arm raising the rotary edging blade, and a movement of the control lever in a second direction results in the control arm lowering the rotary edging blade.

8. The device of claim 1, further comprising:
at least one user control that is in communication with the controller, each of the at least one user control being configured to control an operation of each of the mower motor, the edging motor, and the drive motor.

9. The device of claim 1, wherein one of the operating modes comprises a walk mode wherein the drive motor is active, the mower motor is inactive and the edging motor is inactive.

10. The device of claim 1, wherein one of the operating modes comprises a manual mow mode wherein the drive motor is inactive, the mower motor is active and edging motor is inactive.

11. The device of claim 1, wherein one of the operating modes comprises a Self-propelled mow mode wherein the drive motor is active, the mower motor is active and edging motor is inactive.

12. The device of claim 1, wherein one of the operating modes comprises a manual edging mode wherein the drive motor is inactive, the mower motor is inactive and edging motor is active.

13. The device of claim 1, wherein one of the operating modes comprises a self-propelled edging mode wherein the drive motor is active, the mower motor is inactive and edging motor is active.

14. The device of claim 1, wherein one of the operating modes comprises a manual mow and edging mode wherein the drive motor is inactive, the mower motor is active and edging motor is active.

15. The device of claim 1, wherein one of the operating modes comprises a self-propelled mow and edging mode wherein the drive motor is active, the mower motor is active and edging motor is active.

\* \* \* \* \*